United States Patent [19]

Levy et al.

[11] Patent Number: 4,479,984
[45] Date of Patent: Oct. 30, 1984

[54] RADIATION CURABLE MULTIFILAMENT COMPOSITE

[75] Inventors: Nicha Levy, Atlanta; Parbhubhai D. Patel, Dunwoody, both of Ga.

[73] Assignee: AT&T Bell Laboratories, Murray Hill, N.J.

[21] Appl. No.: 453,576

[22] Filed: Dec. 27, 1982

[51] Int. Cl.³ .............................................. B05D 3/06
[52] U.S. Cl. .................................. 427/54.1; 427/163; 427/44
[58] Field of Search ................. 427/54.1, 163; 264/22, 264/174; 156/180; 350/96.23, 96.24; 204/159.16, 159.22

[56] References Cited

U.S. PATENT DOCUMENTS

| 3,556,888 | 1/1971 | Goldsworthy | 156/180 |
| 3,993,726 | 11/1976 | Moyer | 264/174 |
| 4,230,766 | 10/1980 | Gaussens et al. | 427/54.1 |
| 4,305,770 | 12/1981 | Stiles | 156/180 |
| 4,324,575 | 4/1982 | Levy | 427/54.1 |
| 4,366,667 | 1/1983 | Oestreich | 264/174 |
| 4,369,223 | 1/1983 | Phillips | 427/54.1 |

*Primary Examiner*—John H. Newsome
*Attorney, Agent, or Firm*—James H. Fox; Eugen E. Pacher

[57] ABSTRACT

Multifilament bundles are impregnated with an ultraviolet curable resin to form a composite material suitable for use as a strength member in cables and other applications. The inventive coatings obtain good wetting of the filaments, allowing rapid penetration into the roving or yarn. A much faster coating and curing operation is obtained as compared to prior art methods. Fiberglass strength members made by this technique are especially advantageous for use in optical fiber cables where high strength and a low thermal coefficient of expansion are desired, as well as nonconductivity to protect against lightning strikes.

13 Claims, 4 Drawing Figures

U.S. Patent  Oct. 30, 1984  4,479,984
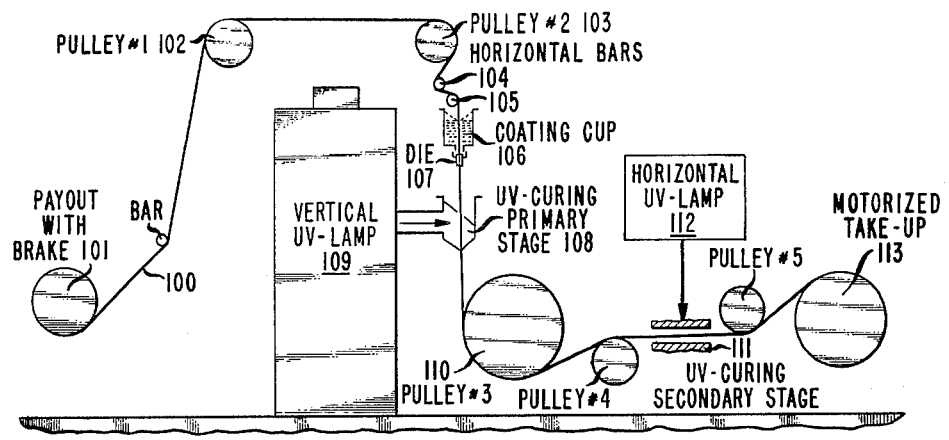
FIG. 1
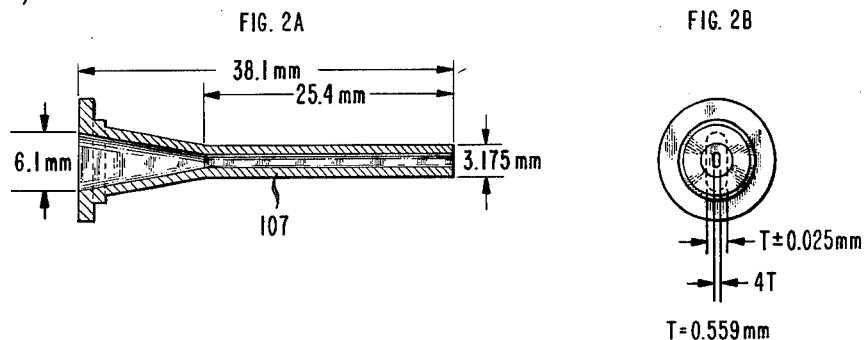
FIG. 2
FIG. 2A
FIG. 2B
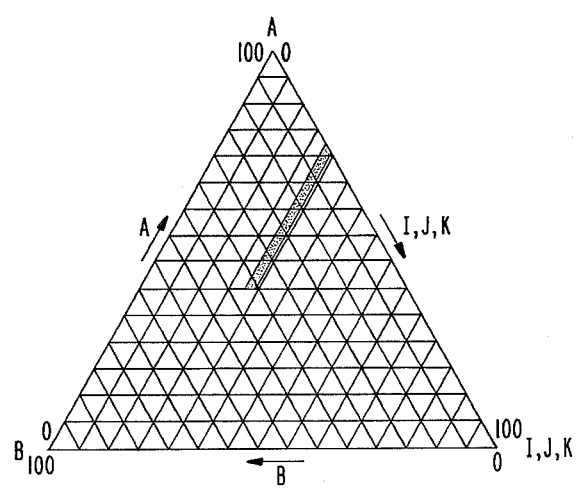
FIG. 3

RADIATION CURABLE MULTIFILAMENT COMPOSITE

BACKGROUND OF THE INVENTION

1. Field of the Invention

This invention relates to a technique for obtaining a multifilament composite material, typically for use as a strength member.

2. Description of the Prior Art

Strength members are used in a wide variety of applications, including cables for telecommunications and other uses. For example, a lightguide cable sheath provides mechanical protection and tensile stiffness to optical fibers. High tensile stiffness is desirable for obtaining a high pulling-load rating without exceeding the maximum allowable fiber strain. One successful cable design is shown in U.S. Pat. No. 4,241,979, coassigned with the present invention. In that design, two layers of stainless steel wires, each embedded in high density polyethylene (HDPE), are helically applied as strength members in the crossply sheath design. An unreinforced HDPE sheath would shrink about 6 percent along its longitudinal axis during the sheathing process. If this shrinkage is not controlled, the fibers would suffer high microbending losses. The steel wires provide the compressive stiffness needed to control this shrinkage.

However, in many applications, it is desirable to have an all-dielectric strength member. A strength member qualified for this application should have both high tensile and compressive stiffness. The high tensile strength requirement is met by unimpregnated fiberglass roving (bundle of fibers with little or no twist) or aromatic polyamide (e.g., KEVLAR, a trademark of E. I. Dupont) yarn. However, their compressive stiffness is low because of the yarn-like structure. The filaments comprising the yarn or roving are unable to support the compressive loads that develop upon cooling of the HDPE sheath and thus buckle. This results in an initial low tensile stiffness region or "knee" in the force-strain response of the cable which is contrary to the design intent of a reinforced sheath.

A continuous filament fiberglass roving has not only high tensile stiffness but is also nonconductive, inexpensive, has a thermal coefficient of expansion compatible with optical fibers, and shows no loss in mechanical properties at the cabling temperature. Therefore, it is an excellent candidate as a strength member. To obtain the required compressive stiffness, however, the roving must be impregnated to promote coupling among the filaments. KEVLAR yarn is also nonconductive, but likewise requires improved compressive stiffness for lightguide cable and other uses.

Commercially, impregnation of E-glass roving has been achieved by a process called pultrusion. In this process, the roving is passed through an epoxy resin bath followed by a long heated die for curing. Because of the long die, this process is relatively slow (processing speeds typically of about 1-2 meters/minute), and hence relatively expensive.

Attempts have been made by the present inventors to extrude nylon over E-glass roving. It was found that the nylon did not penetrate the filaments, and therefore this process was not pursued. Other workers have attempted to coat multistrand carbon fibers with an ultraviolet curable acrylate resin. However, inadequate penetration also resulted. The problem of coating multifilament bundles is in contrast to the coating of single optical fibers, wherein coating application and radiation curing are known in the art. For example, optical fibers are coated with epoxy acrylates, silicones, etc., and cured with ultraviolet light.

SUMMARY OF THE INVENTION

We have invented a method of making composite multifilament members, wherein a coating liquid impregnates a multifilament bundle and is cured by exposure to actinic radiation. The fibers are typically glass or aromatic polyamide, with others being possible. The coating liquid penetrates the bundle and substantially surrounds each of the individual filaments. The presently preferred coating liquid comprises: (A) bisphenol-A-diglycidylether diacrylate resin; optionally (B) aliphatic urethane resin; and at least one diluent selected from the group consisting of: (I) A mixture of penta and quadradecylmethyleneglycol diacrylate; (J) 1,10-decamethyleneglycol diacrylate; and (K) polyethyleneglycol (200) dimethacrylate. The coating liquid can be in the form of a multiphase dispersion, chosen to obtain a low wetting angle on the coated filament. The coated fiber bundle typically comprises at least 100 filaments having diameters of less than 20 micrometers. The present technique typically allows coating and curing at a rate of at least 20 meters/minute.

BRIEF DESCRIPTION OF THE DRAWING

FIG. 1 shows a typical coating apparatus for practicing the present invention;

FIG. 2 shows a coating die suitable for practicing the present invention; and

FIG. 3 shows typical coating component proportions suitable for practicing the present invention.

DETAILED DESCRIPTION

The following detailed description relates to a method of making composite material by applying a radiation curable liquid coating material to a multifilament bundle and curing the material by exposure to radiation.

This invention results in part from the recognition and discovery that a suitable liquid coating material can simultaneously obtain good impregnation, and rapid curing by radiation, in a multifilament bundle. The inventive roving impregnation process (RIP) imparts the desired compressive properties to the bundle, typically glass or KEVLAR. The multifilament bundle can be in the form of a roving (little or no twist), or a yarn, or a twisted bundle. Processing speeds higher than the pultrusion process are achievable. In our process, speeds in excess of 20 meters/minute are readily obtained. To put this processing speed in perspective, the typical speeds for other relevant processes for making optical fiber cables are listed below:

1. Drawing of roving: 400 meters/minute.
2. Optical fiber drawing: 60-150 meters/minute.
3. Filament winding (for making solid parts of impregnated fiberglass): 35-150 meters/minute.
4. Pultrusion: less than 3 meters/minute.

The materials used in the inventive process are a radiation curable coating and a multifilament bundle. The challenge involved in processing these materials into a composite is the wetting of at least several hundred tiny (<20 μm diameter) filaments with liquid coating material and curing the material to provide shear coupling among the filaments.

The following are desirable properties for a suitable coating material:
1. Good wetting of the fiberglass filaments,
2. Fast cure.

Additionally, for use as a strength member in an optical fiber cable having a high density polyethylene (HDPE) sheath applied thereon, the following properties are desired:
3. Resistance to degradation of mechanical properties at the HDPE processing temperature (220° C.),
4. A glass transition temperature not more than 20° C. below the crystallization temperature of HDPE (120°–130° C.) to ensure high compressive stiffness where most of the HDPE shrinkage occurs,
5. Low weight loss below 220° C. to prevent bubble formation (outgassing) during the HDPE extrusion.

It is difficult to formulate a single resin system with good wetting, fast cure in the liquid state, and good high temperature properties in the cured state. A diacrylate resin is presently preferred to obtain high reactivity and hence a rapid cure rate; a dimethacrylate type resin can also yield acceptable properties. High temperature properties can be obtained by a bisphenol-A diacrylate type resin. However, the impregnation of multifilament bundles with this type of resin is typically not sufficiently fast to allow application speeds significantly faster than in the pultrusion process. We have determined that by a suitable choice of diluent, the coating and curing process can be significantly improved. It has further been determined that a low equilibrium contact angle is significant in providing for rapid impregnation of the multifilament bundle. For practicing the present technique, we recommend using a coating liquid having an equilibrium contact angle of less than 20 degrees, and preferably less than 10 degrees, with the filament to be used.

The contact angle of the coating is usually a nonlinear function of the contact angle of its component materials. For binary mixtures, an estimate of the resulting contact angle can be made using a semi-empirical approach; see L. E. Nielson, *Predicting the Properties of Mixtures: Mixture Rules in Science and Engineering*, Marcel Dekker, Inc., New York (1978). We have further discovered that a multiphase coating liquid can be used in the present technique. This allows a much wider choice of component materials for obtaining a coating liquid having the desired properties. For example, diluent (J) above is not miscible in resin A. Also, diluent (I) is not miscible in either resins A or B. Mixtures of these components are opaque dispersions, indicating substantial scattering of light therein. Nevertheless, good coating properties are obtained with these mixtures.

In addition to the acrylate resin and the one or more diluents, a urethane resin can be included to obtain improved flexibility, toughness, and a smooth surface for the composite; an aliphatic urethane is the presently preferred type for these purposes. A suitable urethane resin is described in U.S. Pat. No. 4,324,575, coassigned with the present invention.

Materials suitable for practicing the present invention are listed in Table I:

TABLE I

Diluents
(I) Mixture of penta and quadradecylmethyleneglycol diacrylate

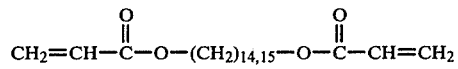

Available as Chemlink 2000 from Sartomer Chemical Company.
(J) 1,10 decamethyleneglycol diacrylate

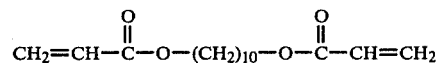

Available as SR287 from Sartomer Chemical Company.
(K) polyethyleneglycol (200) dimethacrylate

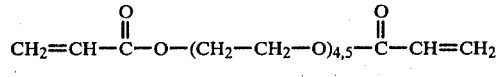

Available as SR252 from Sartomer Chemical Company.
Resins
(A) Bisphenol-A-diglycidyletherdiacrylate

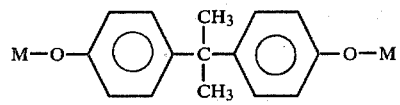

where

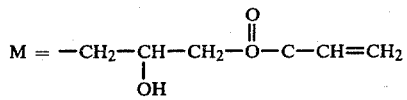

Available as Epocryl 370 from Shell Chemical Company; or Chemlink 3000 from Sartomer Chemical Company.

(B) A reaction product of polypropylene glycol, isophorone diisocyanate, and hydroxyethylacrylate

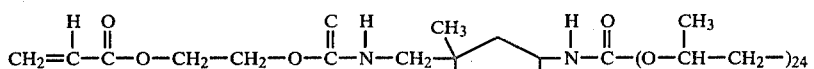

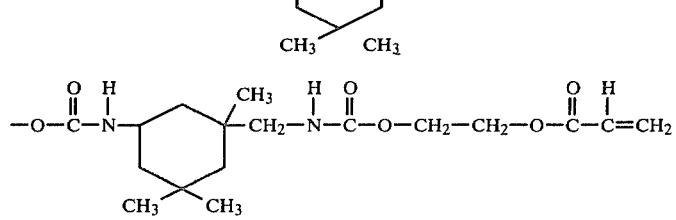

Available as ZL1178 from Thiokol Corporation.

Photoinitiators (not included in composition diagram)

(1) 2,2-Dimethoxy-2, phenylacetophenone (Irgacure 651, Ciba Geigy Corporation)

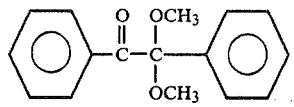

(2) 4,4' Bis(chloromethylenebenzophenone) (F1-4, Eastman Kodak)

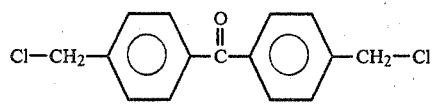

These ingredients are preferably combined by weight in the following percentages (exclusive of photoinitiator): A=40 to 76.3; B=0 to 33.2; I+J+K=23.7 to 25.8. The diluents I, J, K can be used individually or combined to form the proportions shown. A suitable composition diagram is shown in FIG. 3. In addition, when curing is accomplished by UV radiation, a photoinitiator is provided; typically from 1 to 5 weight percent photoinitiator is suitable. Pigments can also be added to obtain a desired color.

Commercial fiberglass is coated with a sizing system containing silanes and binders. The silanes chemically bond to the glass via the silane group and may bond to the coating via the other terminal functional group. The binder's function is to protect the glass during handling and to dissolve in the coating providing the wetting. Both these components lower the surface-free energy of the glass. Both amino- and glycidoxy-terminated silanes are widely used coupling agents for fiberglass rovings. The roving manufacturers recommend the former for polyester and epoxide-terminated matrix materials, while the latter are recommended for epoxide-terminated matrix materials such as used in the pultrusion process. The different silanes are applied to the fiberglass in different binder solutions.

To evaluate the merit of the different coating compositions as matrix materials, knowledge of their physical properties is desirable. Thus, in Table II, a summary of the desired physical properties is given.

TABLE II

| Desired Properties Of Matrix Materials | |
|---|---|
| Property | Desired Properties |
| Viscosity at 38° C. (cP) | 1000–1800 |
| Tg (°C.) | >100 |
| $\alpha_{rubbery}$ (× $10^{-6}$/°C.) | <150 |
| $\alpha_{glassy}$ (× $10^{-6}$/°C.) | <50 |
| Cos θ (on glass) | >0.94 |
| θ (degrees) | <20 |
| $E_{eq}$ (GPa) | >0.06 |
| $E_{Tangent}$ at 23° C. (GPa) | >1 |
| Elongation (%) | >1.0 |

In the following, the reasons for these requirements are discussed:

1. The viscosity range given has been found to provide for optimum impregnation and reduced air entrapment.

2. A glass transition temperature above 100° C. is desired to provide for minimum shrinkage during subsequent high temperature processing. (For example, applying a HDPE cable sheath over the composite strength members.) However, this requirement is not applicable in the case of very densely crosslinked materials, such as those in the shaded area of FIG. 3, which do not show an appreciable change in modulus at the glass transition.

3. The longitudinal thermal expansion coefficient, α, of the matrix should be such that the matrix material does not contribute significantly to the composite property. The lowest α can be attained if the glass transition is above the environmental range. In Table II, the expansion coefficients of both the glassy ($\alpha_{glass}$) and the rubbery ($\alpha_{rubber}$) state of the matrix are reported.

4. The wetting characteristics of a liquid are best described in terms of its surface tension. However, the spreading of a liquid on a given surface can be described in terms of the contact angle θ formed between the liquid and the solid. For a given solid-liquid system, cos θ is proportional to the inverse of the liquid surface tension. Thus, as cos θ approaches 1 and θ approaches 0, the wetting of the solid improves. The values of θ herein were measured at equilibrium at room temperature (20° C.) using a drop on a glass plate, measured with a Contact Goniometer Model A-100 from Rame Hart, Inc.

5. Similarly, a high equilibrium modulus, $E_{eq}$, is desired to maintain the stiffness during cabling and at the upper limit of the environmental range (90° C.).

6. The tensile tangent modulus, $E_{tangent}$, at room temperature should be high to maintain a high stiffness.

7. The ultimate elongation of the matrix should be larger than the desired service strain, which is about 1 percent in typical optical fiber cable applications.

8. The weight loss should be minimal to avoid outgassing during sheathing.

The coatings having proportions indicated in the shaded area of FIG. 3 meet the above requirements.

The curing of the coating is affected by UV light, which excites a photoinitiator, a component of the formulation. The photoinitiator upon excitation produces radicals which initiate a free radical polymerization reaction, and the coating is crosslinked (cured). Curing is affected by the reactivity of the components, the amount of light absorbed by the photoinitiator, which depends on the total dose of incident light and the absorption characteristics of the photoinitiator. In our case, since the glass fibers are not transparent to most of the UV radiation, only a small dose will penetrate the center of the fiber bundle. Thus, a very reactive coating system has to be devised such that the small amount of UV radiation incident on the center of the fiber bundle will ensure complete cure.

During cure, the quantity of heat given off is proportional to the amount of reaction taking place. Since full cure is desirable, it is important to avoid quenching the thermal reaction prior to its completion. The inventive matrix material obtains high processing speeds (i.e., high reactivity). Moreover, thermal quenching can be avoided by using TEFLON (trademark of E. I. Dupont) pulleys in the coating process.

Fiberglass rovings are generally available in two different compositions, E-glass and S-glass. E-glass is an alkali-borosilicate composition, whereas S-glass is a magnesia- alumina-silicate composition. S-glass was developed for military applications and has about 33 percent higher tensile strength than E-glass, but it is presently about ten times more expensive. A lower cost alternative, S-2 glass is presently available at about three times the cost of E-glass but has the same composition and properties as S-glass. S-2 glass has different sizing and less stringent quality control requirements than S-glass. E-glass is available from Owens-Corning (O/C) and PPG, whereas S-glass and S-2 glass are available from Owens-Corning.

Several E-glass rovings having a length-to-weight ratio of 0.91 km/kg (or 450 yards/lb, termed 450-yield), consisting of 2000 filaments (16.5 μm diameter), have been evaluated from both suppliers. The filaments in the roving are bonded by the sizing agent in the form of a flat, ribbon-like structure. These rovings have approximately the same stiffness (60 lbs/percent) as a single replacement of the stainless steel wire. The important properties for these two rovings are listed in Table III along with KEVLAR-49 yarn.

TABLE III
Physical Properties Of Strength Members

| Property | E-Glass Roving | S2-Glass Roving | KEVLAR-49 |
|---|---|---|---|
| Type | HYBON 2079-450 (PPG) HYBON 2077-450 (PPG) Type 30 475-BA450 (O/C) | 250-449AA (O/C) | 2 × 1420 Denier |
| Tensile Strength GPa | 1.379 | 3.103 | 2.759 |
| Tensile Modulus (E) GPa | 72.41 | 86.90 | 124.14 |
| Density (p) gm/cc | 2.556 | 2.491 | 1.439 |
| Coefficient of Expansion ($\alpha$) $10^{-6}/°C$ | 2.8 | 3.1 | −2.0 |
| No. of Filaments | ~2000 | ~12,240 | ~2000 |
| Diameter (micrometers) | 16.5 | 8.89 | 11.9 |
| Cross-Sectional Area (A) $10^{-3}$ cm$^2$ | 4.2765 | 7.5976 | 2.2244 |
| Tensile Stiffness N/Percent | 310 | 660 | 276 |
| Yield km/kg | 0.91 | 0.50 | 3.17 |
| Loss On Ignition (LOI) Percent By Weight | 0.50 ± 0.20 | 0.65 ± 0.10 | Not Available |

FIG. 1 shows a schematic of the coating and curing apparatus. To eliminate twists, the roving (100) is then paid-out under tension (<5 N) from the outside of the spool (101) and passes over large diameter (>10 cm) pulleys (102, 103) with flat grooves. The roving then passes over two stationary horizontal bars (104, 105) to separate and spread the strands. This mechanical working of the roving reduces air entrapment and increases resin penetration during coating. It then passes through the coating cup (106) and die (107). The die provides for the organization of the impregnated filaments into a desired cross-sectional shape. A preferred die design for obtaining good impregnation and a uniform cross section of the resulting composite is shown in FIG. 2. This die has an oblong cross section for obtaining an oblong cross section strength member. However, other shapes (e.g., round, rectangular, tubular, etc.) are possible. The impregnated roving undergoes a primary cure in the primary curing stage (108), illuminated by the vertical UV lamp (109). The curing stage (108) is a housing made of 0.02 inch thick aluminum having an interior coating of Coilzak (trademark of Alcoa) specular finish for increased UV reflectivity. Finally, the partially cured product passes over a 25 cm diameter TEFLON pulley (110) and goes through a secondary curing stage (111), illuminated by the horizontal UV lamp (112). The curing stage (111) comprises a horizontal quartz tube that is silvered on the bottom half for increased UV reflectivity. The reasons for the use of two lamps are described in detail below. The finished product, the matrix impregnated roving (MIR), is take up on a 15 cm diameter plastic (or metal) reel (113). Electromagnetic clutches and brakes are used to obtain good tension control.

Two curing lamps (109, 112) with different output spectra are used to assure both through cure and surface cure. The vertical lamp (109) is a high pressure mercury xenon lamp with a maximum power output of 2.5 kW (Schoeffel LXM 2,500-1) having broad and strong emission lines at 310–366 nm. Because of the low absorbence of the coatings at 366 nm (extinction coefficient $\epsilon_{max}$=100–200 l/moles cm between 320 and 360 nm), more light is transmitted to the inner layers of the coating, and as a result, irradiation with these wavelengths causes mainly cure throughout the thickness of the impregnated roving.

The minimum dose requirement for the primary curing of the matrix materials described in FIG. 3 is 0.2 J/cm$^2$. The maximum usable power from primary curing stage (108) is 1.0 W/cm$^2$, which allows a maximum line speed of 30 meters/minute.

The lamp housing is a Schoeffel-Kratos LH152 equipped with a 5.72 cm quartz condenser, heat sink, and reflector. A blower below the lamp cools the housing though air intake from a butterfly valve. Low air intake through the butterfly valve was allowed during cure to maintain a high lamp temperature and thus excite all mercury emission lines. The power supply and igniter for this lamp is an LPS 400 having a rating of 70 kVDC and 170 A.

The horizontal lamp (112) is a medium pressure 1300 W mercury Hanovia lamp No. 6506A, 15.2 cm arc length. Because of its lower gas pressure, this lamp has a higher intensity at 254 nm than the high pressure Schoeffel lamp. Because of the strong absorption coefficient of the coating at 254 nm ($\epsilon \sim$20,000), irradiation with this wavelength causes mainly surface cure. The minimum dose required for secondary curing of the matrix materials described in the shaded area of FIG. 3 is 0.5 J/cm². The maximum usable power from the secondary curing state (111) is 0.5 W/cm², which allows a maximum line speed of 30 meters/minute.

EXAMPLE I

A fiberglass roving comprising approximately 2000 filaments, each having a diameter of about 16.5 micrometers (Hybon 2077-450 available from PPG), was coated and cured in the apparatus of FIG. 1. The coating material applied had the formula by weight of: 72 percent resin A (bisphenol-A-diglycidylether diacrylate); 25 percent diluent I (mixture of penta and quadradecylmethylene); and 3 percent photoinitiator (Irgacure 651). Coating and curing speeds of up to 21 meters per minute were successfully accomplished, being limited only by the drive speed capabilities of the takeup reel. The resulting composite material was successfully used in place of the stainless steel wires used in the optical fiber cable described in above-noted U.S. Pat. No. 4,241,979.

EXAMPLE II

An aramid roving comprising approximately 2000 filaments, each having a diameter of about 11.9 micrometers (KEVLAR-49 from E. I. Dupont), was coated with the same material in the above Example. Impregnation and curing were successfully accomplished at a rate of 7.6 meters/minute. The speed was limited by excessive tension in the takeup reel caused by fraying of the filaments; a higher tension capacity takeup system allows speeds in excess of 20 meters/minute.

EXAMPLE III

In this Example, a series of matrix materials I through VII listed in Table IV was used to impregnate fiberglass rovings comprising approximately 2000 filaments, each having a diameter of about 16.5 micrometers (Corning Glass Company Type 475-50). In Table IV, the composition of each matrix material is listed in weight percent.

TABLE IV

| Component | Matrix Materials | | | | | | |
|---|---|---|---|---|---|---|---|
| | I | II | III | IV | V | VI | VII |
| A | 40.15 | 54.75 | 58.4 | 65.7 | 73 | 73 | 54.75 |
| B | 31.95 | 17.7 | 14.2 | 71 | 0 | 0 | 18 |
| I | 0 | 0 | 0 | 0 | 0 | 25 | 25 |
| J | 10.8 | 6.06 | 4.8 | 2.4 | 0 | 0 | 0 |
| K | 13.75 | 18.75 | 20 | 22.5 | 25 | 0 | 0 |
| Kodak F14 | 2.35 | 2.25 | 2.2 | 2.1 | 2 | 0 | 0.75 |
| Irgacure 651 | 0.9 | 0.49 | 0.4 | 0.2 | 0 | 2 | 1.50 |

Each was successfully coated and cured at a speed of up to 21 meters/minute. The resulting composites were substantially free of voids, fully cured, and provided desired mechanical performance.

A microscopic examination of the above composites has shown that substantially all of the filaments were surrounded by the coating fluid. Analysis has shown that the void fraction of the cured composite is less than 10 percent, and typically less than 5 percent by volume. Void fractions of even less than 1 percent have been achieved. Such substantially complete impregnation of the bundle produces a composite having the desired coupling between the filaments for load-sharing and other desired properties. Other components can be utilized in the coating formulation. For example, one or more surfactants can be included to further lower the wetting angle for improved impregnation. A typical surfactant is a fluorinated alkyl ester (e.g., 3M Company FC430), which can allow the use of smaller diluent quantities.

While the above Examples have utilized ultraviolet radiation for curing, other curing radiation is possible. For example, electron beam curing can be used, in which case a free-radical photoinitiator is typically not required in the coating material. Electron irradiation allows curing to depths greater than that readily obtainable with UV radiation, typically about 1 millimeter.

The composites produced by the present technique can be used for purposes other than, or in addition to, their use as a strength member. For example, an optical fiber cable structure is known in the art whereby one or more optical fibers are surrounded by fiberglass strength members in a composite structure. A buffer layer of a low modulus material, for example a silicone, can be disposed between the optical fiber and the strength members. Such a structure can advantageously be made by the present technique. It is also known in the art to coat metallic filaments to obtain a conductive composite, which can be used for electromagnetic shielding of a cable or as an electrical power conductor. Carbon filaments can also be used in a composite for electromagnetic shielding purposes in addition to, or apart from, their use as a strength member. In some structures, low stiffness is desired for increased flexibility. A low modulus coating material can then be used in the present technique. For example, radiation curable silicones are known in the art; see also the above-noted U.S. Pat. No. 4,324,575 for low modulus radiation curable materials, with still others being possible. Other coating processes can be used in conjunction with the present technique, as when applying a secondary coating around the composite produced by the present technique.

All such applications that utilize the inventive teaching are within the scope of the present invention.

What is claimed is:

1. A method of making a composite material comprising passing through a coating means at least one bundle comprising a multiplicity of filaments, thereby impregnating the bundle with a liquid material, and exposing at least a part of the impregnated portion of the bundle to actinic radiation to at least partially cure the liquid coating material, characterized in that the liquid coating material comprises:

(A) bisphenol-A-diglycidylether diacrylate resin; and optionally (B) a urethane resin;

and further comprises at least one diluent selected from the group consisting of:

(I) a mixture of penta and quadradecylmethyleneglycol diacrylate;

(J) 1,10 decamethyleneglycol diacrylate;

(K) polyethyleneglycol (200) dimethacrylate.

2. The method of claim 1 wherein the ingredients (A), (B) and (I), (J), (K) have the relative proportions by weight of: A=40 to 76.3; B=0 to 33.2; and I+J+K=23.7 to 25.8, wherein A+B+I+J+K=100.

3. The method of claim 1 wherein the filaments of said bundle are glass filaments.

4. The method of claim 1 wherein the filaments of said bundle are aromatic polyamide filaments.

5. The method of claim 1 wherein said bundle comprises at least 100 filaments each having a diameter of less than 20 micrometers.

6. The method of claim 5 wherein said coating and curing are accomplished at a linear rate of at least 20 meters of multifilament bundle per minute.

7. The method of claim 1 wherein said radiation is ultraviolet radiation, and said material further comprises a photoinitiator that promotes the curing of said material by said radiation.

8. The method of claim 1 wherein said bundle further comprises at least one optical fiber.

9. A method of making a composite material comprising (a) passing through a coating means at least one bundle comprising a multiplicity of filaments, thereby impregnating the bundle with a liquid coating material so as to substantially contact substantially all filaments in the bundle with the coating material, and (b) simultaneously exposing an impregnated portion of the bundle to actinic radiation, thereby at least partially curing the coating material, characterized in that (c) the liquid coating material comprises:

(I) bisphenol-A-diglycidylether diacrylate resin; and optionally (J) a urethane resin;

and further comprises at least one diluent selected from the group consisting of:

(K) a mixture of penta and quadradecylmethyleneglycol diacrylate;

(L) 1,10 decamethyleneglycol diacrylate; and (M) polyethyleneglycol (200) dimethacrylate.

10. The method of claim 9 wherein the ingredients (I), (J), (K), (L), (M) have the relative proportions by weight of: $I = 40$ to $76.3$; $J = 0$ to $33.2$; and $K + L + M = 23.7$ to $25.8$, wherein $$I + J + K + L + M = 100.$$

11. Method of claim 1 wherein the liquid coating material is adapted to yield a cured composite material having no more than 10 percent void fraction when the bundle is passed through the coating means at about 20 m/minute.

12. Method of claim 7 wherein the curing of the coating material comprises a primary cure and a secondary cure, the primary cure adapted to cause curing substantially throughout the volume of coating material exposed to the ultraviolet radiation, and the secondary cure is adapted to cause substantially only surface curing.

13. A composite material made according to the method of claim 1, 2, 3, 4, 5, 6, 7, 9, 10, 11, or 12.

* * * * *